Sept. 2, 1930.  A. W. ROWLEY  1,774,947
FOOD TROUGH
Original Filed June 16, 1927
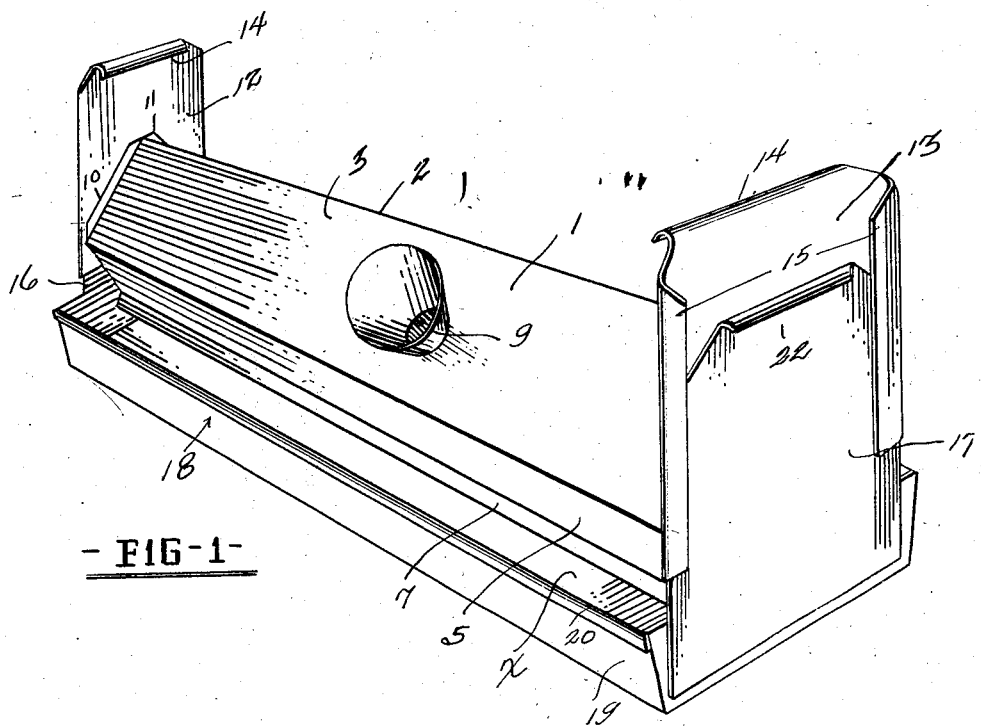
- FIG-1-
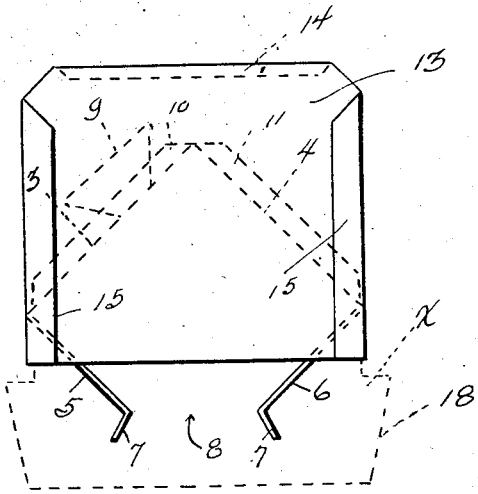
- FIG-2-
Inventor
A. W. ROWLEY,
Attorney Patented Sept. 2, 1930

1,774,947

UNITED STATES PATENT OFFICE

ANDREW W. ROWLEY, OF RICHFIELD, UTAH

FOOD TROUGH

Application filed June 16, 1927, Serial No. 199,217. Renewed January 29, 1930.

My present invention, in its broad aspect, has reference to improvements in food troughs for domestic fowls such as chickens and the like, of the type wherein means are provided for automatically replenishing the supply in the trough as it is consumed, a storage reservoir being provided for that purpose, and wherein the size of the opening through which access is had to the trough may be properly regulated, and replenishing of the supply in the trough from the reservoir controlled.

More particularly it is my purpose to provide a food trough of the above broadly defined character, wherein a simple movement of the supply reservoir with respect to the trough will serve both to regulate or control the replenishing of the supply from the reservoir to the trough, and at the same time regulate the size of the opening through which access is had to the trough thereby adapting my device for use with any size fowls, from small chicks to full grown birds, or the like. My device, furthermore is so designed that certain of the walls of the storage reservoir are, to a certain extent, movable, or formed to provide for limited "give" to prevent clogging and to facilitate agitating the contents thereof to facilitate discharge, same being accomplished by pushing or "pecking" of the fowls on the said walls.

Especially it is my purpose to provide a very simple, efficient, and readily and cheaply manufactured article, and to this end my device is formed of sheet-metal and has but two separate units in its assembly, each of which is a permanently set-up object. To this end my supply reservoir, or hopper, is an integral sheet-metal device having sheet-metal upstanding end members soldered or brazed thereon and which are adapted to work in slides which are soldered or brazed to the sheet-metal trough unit. The slides and the end members are turned to form finger grips.

Other and equally important objects of my invention may be briefly defined as follows: first, my device is adapted to be formed without nails or rivets; second, it has no concealed creases or the like and thereby may be readily kept clean; third, there are no parts which could cause injury to fowls, and it is impossible for a fowl or chick to jump or crowd into the trough, and; fourth, my device is designed to serve a useful and practical purpose as a barnyard accessory and may be manufactured and sold at relatively small retail cost.

Other and equally important objects and advantages will become apparent as the description of my invention proceeds, but while I have in the present instance defined for the sake of illustration an article of a certain specific form, it will be understood that I do not desire to limit myself except as may be indicated by the scope of the claims appended hereto and forming a part of this specification.

In the drawings wherein is illustrated an embodiment of my invention:—

Figure 1 is a perspective view of my device set up,

Figure 2 is an end view of the hopper or reservoir unit of my device; the trough being shown in dotted lines.

In the drawings wherein like characters of reference are used to designate like or similar parts throughout the several views:—

The numeral (1) designates the supply reservoir or hopper which is integrally formed of sheet-metal bent lengthwise to form a four sided figure one edge (2) thereof being uppermost and the top sides (3) and (4) slanting downwardly therefrom on opposite sides. The bottom sides (5) and (6) extend inwardly toward each other at right-angles to the sides (3) and (4) and are each flanged as at (7). The flanges (7) are flared outwardly and a space (8) is left between the sides (5) and (6) and flanges (7) which is the outlet of the hopper. A funnel (9) is brazed into one of the top sides for filling the hopper.

The top sides (3) and (4) are flanged as at (10) and (11), and to these flanges the upstanding end pieces (12) and (13) are soldered or brazed. It will be noted that the bottom sides (5) and (6) are free from the end pieces (12) and (13) and consequently have a certain amount of "give". The top edges of the end pieces (12) and (13) are each bent over to form a finger grip (14), and the side edges thereof are bent inwardly upon themselves as at (15) to form channels in which the end pieces (16) and (17) of my trough (18) are adapted to be received.

My trough (18) is preferably a rectangular, sheet-metal pan like device the sides (19) of which are slightly flared outwardly and have their top edges turned upon themselves as at (20) to form channels for receiving guard devices (21). The end pieces (16) and (17) are soldered or brazed to the end of the trough and extend upwardly to support the end pieces of the hopper or reservoir. The engagement between end pieces (16) and (17) with the channels formed by bent portions (15) of end pieces (12) and (13) being sufficiently tight so that some pressure (as by the hands) must be used to move the trough with respect to the hopper. The top edges of end pieces (16) and (17) are bent over to form finger grips (22).

The guard devices (21) are formed of strip metal bent lengthwise at right angles and then inwardly as at (23) and (24) to respectively engage about the turned edge (20) and to engage the side (19) of the trough as shown in Figure 3. The guards are slidable on and off of the trough.

In operation, movement of the hopper with respect to the trough accomplishes two purposes; first, it regulates or controls the passage of food from the hopper to the trough by regulating the space from the flanges (7) and bottom of the trough, and; second, the space (X) between sides (5) and (6) and edges of the sides of the trough is regulated for different sizes of fowls. Thus, the greater the distance between the hopper and trough the larger the space (X) and the faster the supplying of feed and vice-versa. The hopper is simply filled through the funnel (9) with feed and such feed is dispensed to the trough as it is consumed. The "pecking" and crowding of the fowls will vibrate the sides (5) and (6) to prevent clogging and facilitate dispensing of the feed.

Furthermore, the flanges on the sides of the reservoir may be reversed if desired, and in any event such flanges prevent the fowls or chickens from getting into the feed, thus keeping the feed clean and preventing it from being scratched about over the ground. If desired a small gutter or strip may be formed on the reservoir to catch drippings and dirt.

While in the foregoing there has been illustrated in the drawings and described in the specification such combination and arrangement of elements as constitute the preferred embodiments of my invention, it is nevertheless desired to emphasize the fact that interpretation of the invention should only be conclusive when made in the light of the subjoined claims.

I claim:—

1. A device of the type described comprising, a trough, upstanding end pieces on the trough, a receptacle for substance to be fed to the trough, end pieces on the receptacle and flanged to slidably embrace the edges of the end pieces on the trough to adjustably support the receptacle above the trough.

2. A device of the type described comprising, a trough, upstanding end pieces on the trough and formed with bent over ends constituting finger grips, a receptacle for substance to be fed to the trough, end pieces on the receptacle and flanged to slidably embrace the edges of the end pieces on the trough to adjustably support the receptacle above the trough, said end pieces on the receptacle having their free ends bent over to form finger grips.

3. A device of the type described comprising, a sheet-metal trough having outwardly flared sides, upstanding sheet metal pieces on the ends of the trough and formed with bent over ends constituting finger grips, a sheet metal receptacle for substance to be fed to the trough, sheet metal end pieces on the receptacle and flanged to slidably embrace the edges of the end pieces on the trough to adjustably support the receptacle above the trough, said end pieces on the receptacle having their free ends bent over to form finger grips.

In testimony whereof, I affix my signature hereunto.

A. W. ROWLEY.